(12) United States Patent
Krogh et al.

(10) Patent No.: US 8,106,562 B2
(45) Date of Patent: Jan. 31, 2012

(54) SLIP RING ASSEMBLY WITH SHAFT HOLDER

(75) Inventors: Lars Krogh, Egå (DK); Steen Bjerg Lauridsen, Kolding (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 13/125,869

(22) PCT Filed: Sep. 25, 2009

(86) PCT No.: PCT/DK2009/050249
§ 371 (c)(1),
(2), (4) Date: May 10, 2011

(87) PCT Pub. No.: WO2010/048956
PCT Pub. Date: May 6, 2010

(65) Prior Publication Data
US 2011/0210644 A1    Sep. 1, 2011

Related U.S. Application Data

(60) Provisional application No. 61/197,404, filed on Oct. 27, 2008.

(30) Foreign Application Priority Data

Oct. 27, 2008 (DK) .................................. 2008 01474

(51) Int. Cl.
*H01R 39/08* (2006.01)

(52) U.S. Cl. ........................ 310/232; 310/68 B; 310/128

(58) Field of Classification Search .................. 310/231, 310/232, 68 B, 127, 128, 143, 147
See application file for complete search history.

(56) References Cited

U.S. PATENT DOCUMENTS

| 4,752,683 A | 6/1988 | McGuire |
| 5,920,134 A | 7/1999 | Mayer et al. |
| 7,119,471 B2 * | 10/2006 | Kiderman et al. ............ 310/162 |
| 2003/0137210 A1 * | 7/2003 | Southall et al. ............... 310/232 |

FOREIGN PATENT DOCUMENTS

| DE | 103 48 347 | 6/2004 |
| JP | 2002-171723 | 6/2002 |
| JP | 2004-159420 | 6/2004 |

OTHER PUBLICATIONS

Rafael Sedlmeyer; International Search Report and Written Opinion issued in priority International Application No. PCT/DK2009/050249; Jan. 29, 2010; 12 pages; European Patent Office.

(Continued)

*Primary Examiner* — Dang D Le
(74) *Attorney, Agent, or Firm* — Wood, Herron & Evans, L.L.P.

(57) ABSTRACT

The present invention relates to a slip ring assembly for providing electricity to a rotor which is able to rotate in relation to a stator in a generator or an electrical motor, the slip ring assembly being in connection with an encoder. The slip ring assembly includes a slip ring unit having at least one first slip ring, and an encoder shaft holder connected to the slip ring unit and in which holder an encoder shaft is situated. The encoder shaft holder is made from an electrically insulating material for providing an electrical insulation between the slip ring unit and the encoder.

8 Claims, 6 Drawing Sheets

OTHER PUBLICATIONS

Steffen Hostrup Larsen; 1st Technical Examination Report issued in priority Denmark Application No. PA 2008 01474; Apr. 21, 2009; 4 pages; Denmark Patent and Trademark Office.

Steffen Hostrup Larsen; Denmark Search Report issued in priority Denmark Application No. PA 2008 01474; Apr. 15, 2009; 1 page; Denmark Patent and Trademark Office.

* cited by examiner

SLIP RING ASSEMBLY WITH SHAFT HOLDER

FIELD OF THE INVENTION

The present invention relates to a slip ring assembly for providing electricity to a rotor which is able to rotate in relation to a stator in a generator or an electrical motor and which is connected with an encoder, the slip ring assembly comprising a slip ring unit having at least one first slip ring and an encoder shaft holder connected to the slip ring unit, in which holder a encoder shaft is situated. Furthermore, the invention relates to a generator, a wind turbine and wind turbine park comprising such a slip ring assembly.

BACKGROUND ART

A wind turbine converts wind power into electrical energy through a generator driven by the blades of the wind turbine under windy conditions. In some wind turbines, the generator comprises a stator and a rotor both having multiphase windings, such as a double-fed induction generator, a cascade-regulated generator, an induction or a synchronic generator, or even a DC generator.

When having a rotor rotating in relation to a stator of a generator, electricity has to be transferred to or from the rotor. Electricity may be transferred by means of a slip ring assembly also called a rotary electrical interface, rotating electrical connector, collector, or swivel or electrical rotary joint, enabling the rotor to receive or return electricity while rotating in relation to the stator. When having a rotor with a multiphase winding, a control system within the wind turbine is able to regulate the frequency, so that the wind turbine produces at a predetermined frequency, e.g. approximately 50 Hz.

In order to control the magnetic field within the generator, the slip ring unit may be provided with a shaft which is connected with an encoder. Due to the fact that the slip ring unit transfers electricity to or from the rotor, the shaft has been electrically insulated so that the encoder is not destroyed by electricity unintentionally transferred from the slip ring unit. The insulation is provided by means of an insulation shaft in plastic housing the first shaft, which insulation shaft is inserted into the encoder. In this way, the encoder can no longer be destroyed by unintentional electricity.

However, in production it has been very difficult to keep the outside diameter of the plastic shaft within the allowable dimension tolerance in relation to the encoder, as a consequence of which the encoder may fail to count the actual number of turns of the rotor.

SUMMARY OF THE INVENTION

An object of the present invention is, at least partly, to overcome the above disadvantages and drawback of the prior art and to provide an improved slip ring assembly enabling a more accurate control of the magnetic field within the rotor.

More specifically, it is an object to provide an improved slip ring assembly comprising an encoder shaft having an outside diameter which is always within the allowable dimension tolerance enabling the encoder to function perfectly.

A further object is to provide an improved slip ring assembly which is easy to produce.

Furthermore, it is an object to provide an improved slip ring assembly with an insulated shaft in relation to the encoder so that the encoder is not destroyed by electricity unintentionally transferred from the slip ring unit.

Also, it is an object to provide a wind turbine which is able to control the electric output perfectly, also over a long production period.

The above objects, together with numerous other objects, advantages, and features, which will become evident from the below description, are accomplished by a solution in accordance with the present invention by a slip ring assembly for providing electricity to a rotor rotating in relation to a stator in a generator or an electrical motor, the slip ring assembly being connected with an encoder and comprising:
  a slip ring unit having at least one first slip ring, and
  an encoder shaft holder connected to the slip ring unit and in which holder a encoder shaft is situated,
wherein the encoder shaft holder is made from an electrically insulating material.

The solutions of the prior art have focused on having a separate insulation part i, as shown in FIG. 1, so that the encoder is not destroyed by electricity unintentionally transferred from the slip ring unit. The part of the prior art slip ring assembly to which the encoder shaft is fastened is typically made from metal due to the fact that such a holder also functions as a ground connection.

In the solution according to the invention, the holder is made from an electrically insulating material and the ground connection is placed in the other end of the slip ring unit facing the rotor. The encoder shaft holder fastens the encoder shaft so that the encoder shaft rotates with the slip ring unit and thus the rotor. Thus, the material for the manufacture of the encoder shaft can be chosen freely. In this way, the encoder shaft is isolated and can be manufactured in a material to which the dimension tolerance of the encoder shaft in relation to the encoder can be kept.

By having a slip ring assembly with an encoder shaft of metal, the encoder shaft can be cut down to the accurate dimension within the predetermined tolerance after the slip ring unit has been assembled. Hereby, the inaccurate counting of turns by the encoder is avoided due to varying dimensions. In this way, an improved slip ring assembly enabling a more accurate control of the magnetic field with the rotor is obtained.

When having a holder of metal or the like heatable material, as is the case in prior art solutions, the holder is heated during use of the slip ring unit causing the holder to expand due to the heat. In this way, the dimensions of the holder change during use of the slip ring assembly, and thus the shaft and the insulation shaft change accordingly. As a result, the connection to the encoder becomes unstable so that the encoder is not able to count the actual turns of the slip ring and thus the rotor.

In one embodiment of the invention, the encoder shaft holder is moulded.

Moulding the encoder shaft holder makes the process of making the holder quick, and the encoder shaft can be fastened by moulding the holder around the shaft.

In another embodiment, the electrically insulating material may be some kind of plastic, ceramics, fibreglass, composite, or a combination thereof.

When the encoder shaft is made from an electrically insulating material, such as plastic, ceramics, fibreglass, composite, or a combination thereof, the encoder shaft holder can be manufactured easily by means of a moulding process and in a variety of shapes. Since the encoder shaft is subsequently cut into its final dimensions, the holder does not have to keep within a very narrow dimension range. Furthermore, the holder is not substantially heated and is able to keep its dimensions also during use of the slip ring assembly.

In addition, the encoder shaft holder may be fastened to the slip ring unit in an end of the slip ring unit opposite the rotor.

Furthermore, the encoder shaft holder may be glued onto the slip ring unit.

By using gluing, the production of the slip ring slip ring assembly is very easily performed, and the material is not heated unintentionally.

In one embodiment of the invention, the encoder shaft holder may have a projecting part in which the encoder shaft is fastened.

When the encoder shaft is fastened in a projecting part, the surface facing the shaft is increased and fastening of the shaft within the projecting part of the holder is easier and more reliable. This is especially the case when using a moulding process or a subsequent gluing process.

In another embodiment, the encoder shaft holder may have a substantially plane surface facing the slip ring unit.

Hereby, the holder is more easily fastened to the slip ring unit.

In yet another embodiment of the invention, the encoder shaft holder may have a part having approximately the same circumference as the slip ring unit.

Furthermore, the encoder shaft holder may be moulded when moulding the slip ring unit.

Hereby, the slip ring unit and the holder are moulded as one unit and in the same process resulting in a more simple production and one spare part less.

The invention also relates to a generator comprising a slip ring assembly as described above.

Finally, the invention relates to a wind turbine comprising a slip ring assembly as described above.

BRIEF DESCRIPTION OF THE DRAWINGS

The invention and its many advantages will be described in more detail below with reference to the accompanying schematic drawings which, for the purpose of illustration, show some non-limiting embodiments and in which.

All the drawings are schematic and not necessarily to scale, and they show only those parts necessary to elucidate the invention, other parts being omitted or merely suggested.

DETAILED DESCRIPTION OF THE INVENTION

Figure 2:
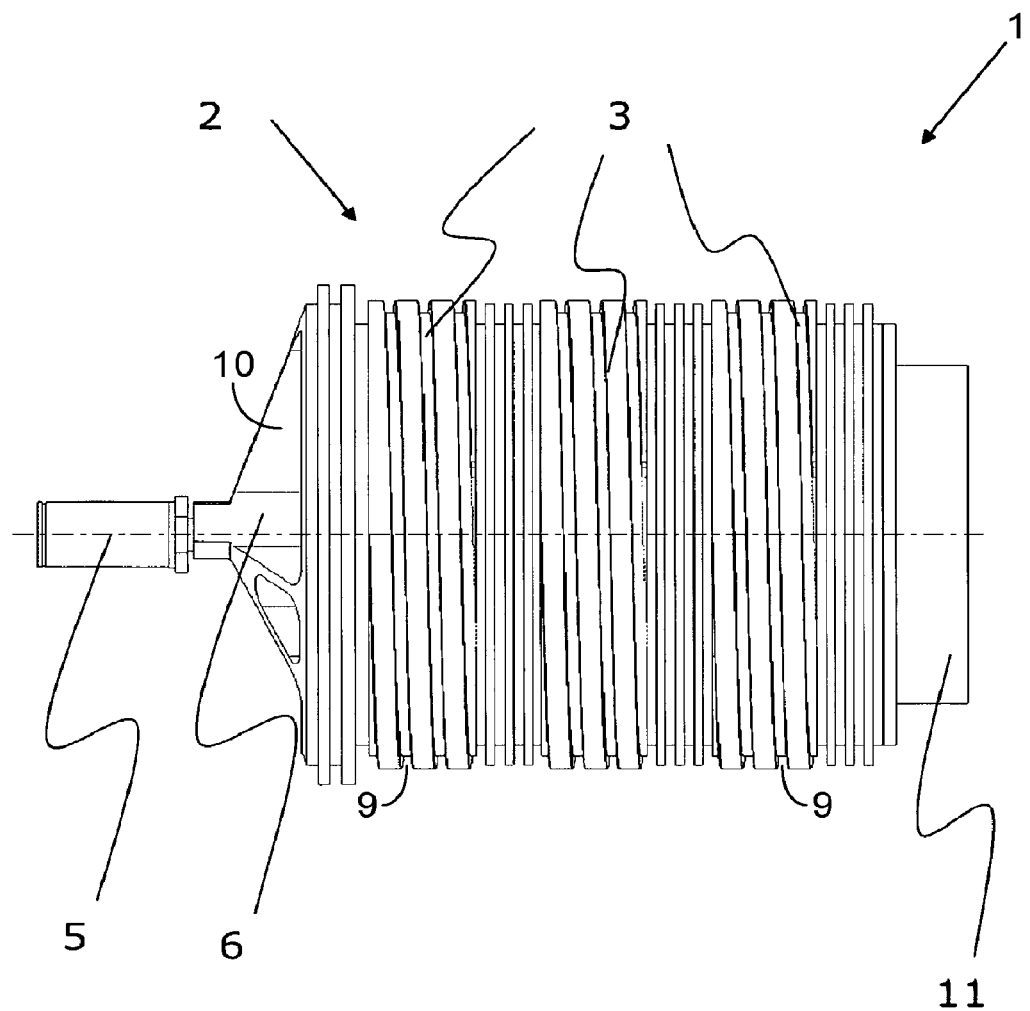
FIG. 2 shows one embodiment of a slip ring assembly according to the invention.

In FIG. 2, a slip ring assembly 1 according to the invention is shown. When in use, the slip ring assembly 1 provides electricity to a rotating part, such as a rotor rotating in relation to a stator in a generator or another electrical machine. The slip ring assembly 1 comprises a slip ring unit 2 having at least one slip ring 3 with an outer surface. The slip ring 3 is situated in the slip ring unit 2 and is typically fastened when moulding the unit. In one end of the slip ring unit 2, three centre bars (not shown) protrudes from the unit 2 for transferring of electricity to the rotor. Thus, the slip ring assembly 1 is able to rotate around a centre axis which coincides with the centre axis of the centre bar.

As shown in FIG. 2, the slip ring assembly 1 has a plurality of slip rings 3 and, in this embodiment, the slip ring assembly 1 has three slip rings 3—one for each electrical phase. Furthermore, each slip ring 3 has at least one groove 9. The groove 9 may have any shape or design and, in another embodiment, the slip ring 3 has a plurality of grooves. Having such a groove 9 in the surface increases the surface area of the ring 3, and thus the ability to cool the slip ring is also increased.

In addition, the slip ring assembly 1 comprises an encoder shaft holder 6 which has been moulded in an electrically insulating material. An encoder shaft 5 is subsequently inserted into the encoder shaft holder, or the encoder shaft holder is moulded around the encoder shaft.

Figure 1:
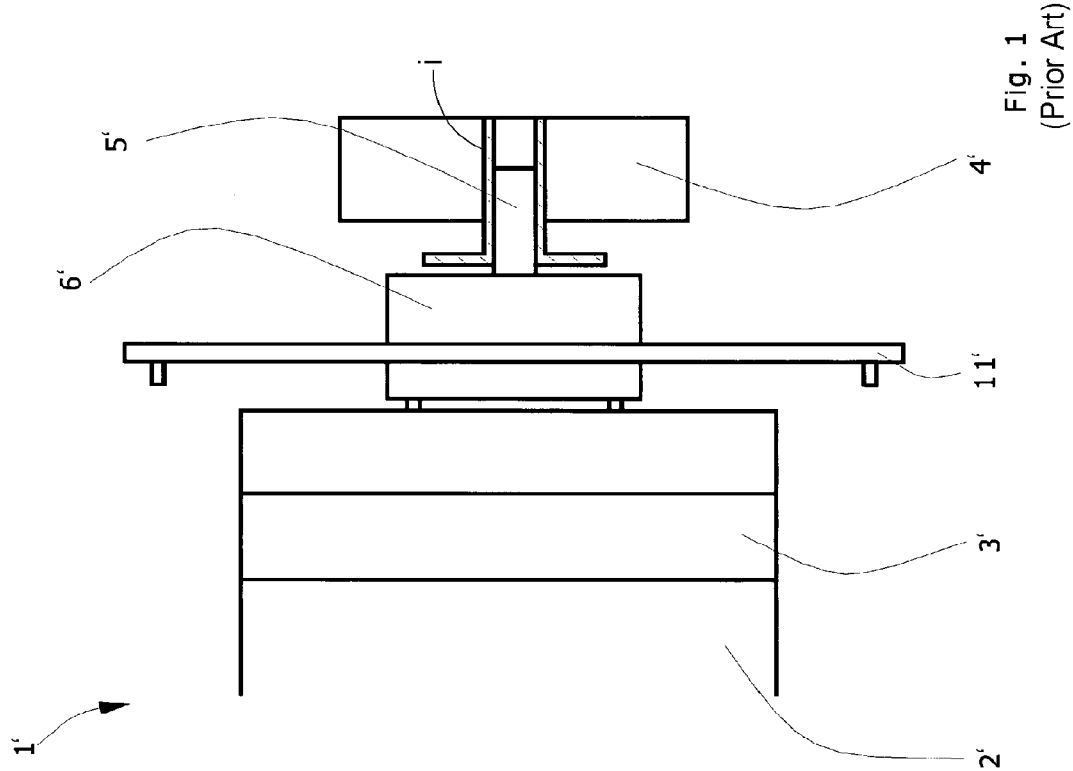
FIG. 1 shows a prior art slip ring assembly.

By making the encoder shaft holder 6 from an electrically insulating material, a separate insulation part can be spared, making the production of the slip ring assembly more simple and without incurring extra costs. For comparison purposes, a prior art slip ring assembly 1' having a slip ring unit 2' with slip rings 3' coupled to an encoder 4' via an encoder shaft holder 6', encoder 5', separate insulation part i, and ground connection 11' is shown in FIG. 1. Furthermore, the encoder shaft 5 can be made from a material in which the outside dimension of the shaft can be kept so as to fit into the encoder.

Figure 3:
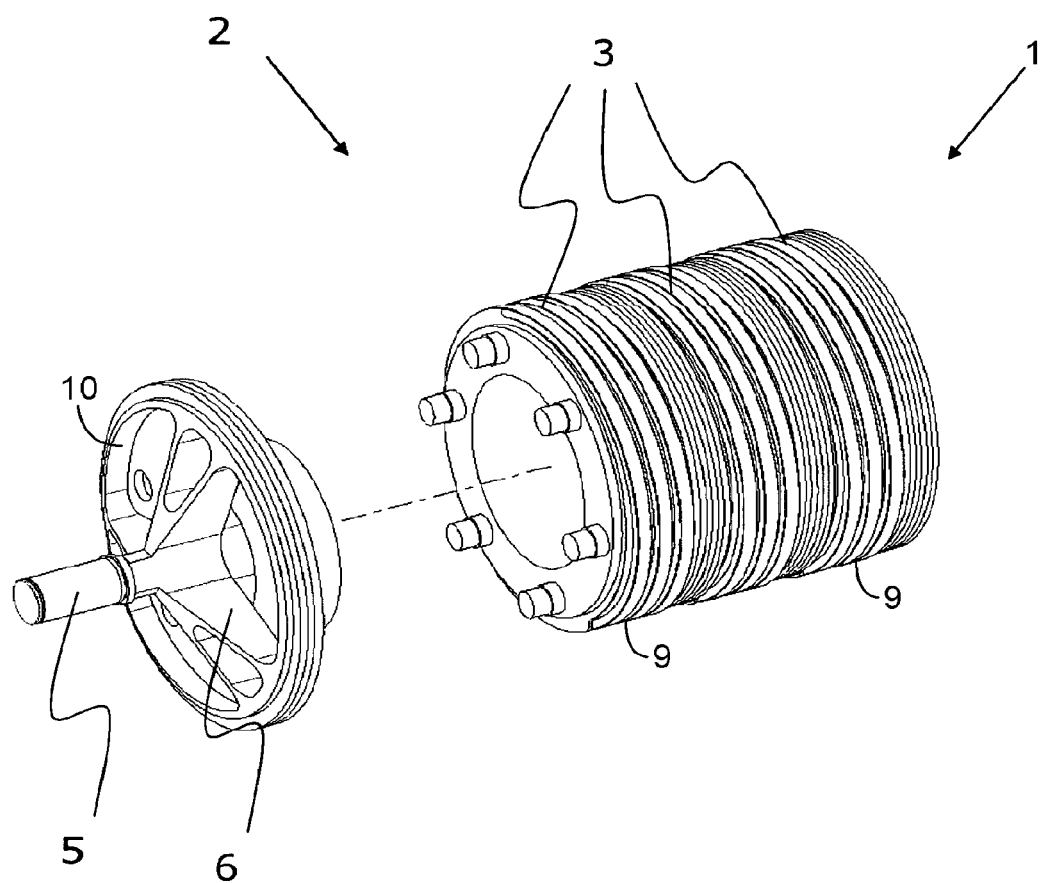
FIG. 3 shows the embodiment of FIG. 2 in an exploded perspective view.

As shown in FIG. 3, the encoder shaft holder 6 is, in this embodiment of the slip ring assembly 1, a separate part from the slip ring unit 2. The encoder shaft holder 6 is moulded and, subsequently, the holder is fastened to the slip ring unit 2. The fastening of the encoder shaft holder 6 to the slip ring unit 2 may be performed by means of any suitable joining process, such as gluing, welding, or the like, or by means of fastening means, such as screws.

In the embodiment of FIG. 3, the encoder shaft holder 6 has indentations 10 which enables the encoder shaft holder to be manufactured by injection moulding, compression moulding, or the like moulding process.

Figure 4:
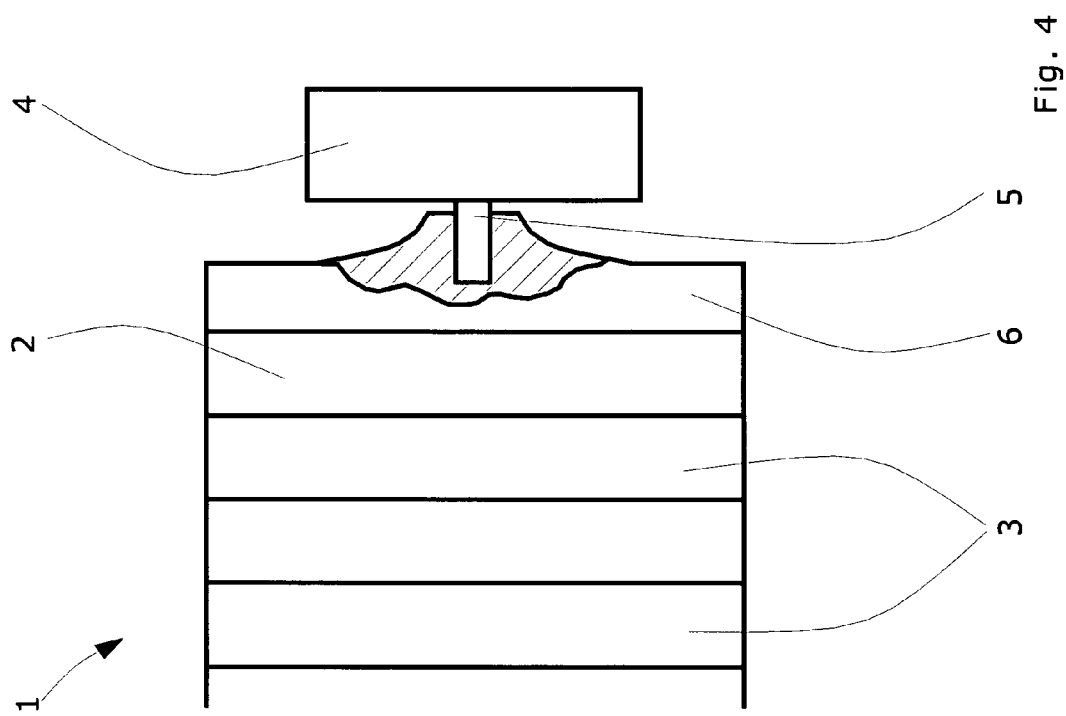
FIG. 4 shows a partly cross-sectional view of another embodiment of a slip ring assembly.

In another embodiment of the invention, the encoder shaft holder 6 has a more solid design without indentations as shown in FIG. 4.

Figure 5:
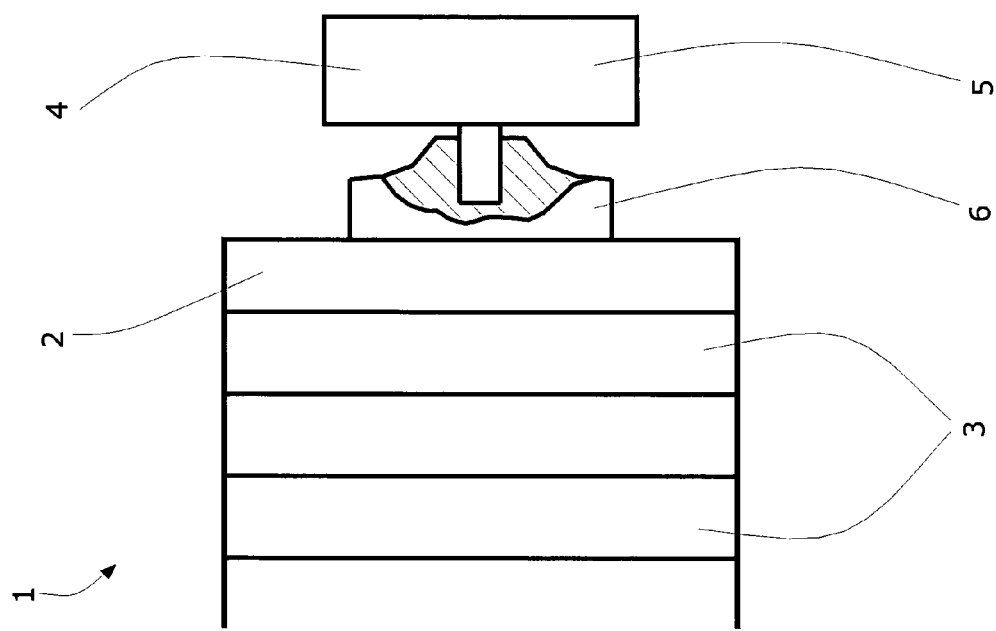
FIG. 5 shows a partly cross-sectional view of yet another embodiment of the slip ring assembly.

In the embodiments of FIGS. 4 and 5, the encoder shaft holder 6 is moulded as a separate part. However, in another embodiment, shown in FIG. 6, the encoder shaft holder 6 has been moulded together with the slip ring unit 2. When moulding the encoder shaft holder and the slip ring unit as one unit, the subsequent fastening process can be spared.

As shown in FIGS. 4 and 5, the encoder shaft 5 is inserted into the centre of an encoder 4, which counts the number of turns of the rotor. The encoder 4 is in communication with a control system controlling the magnetic field within the rotor from the number of turns measured in the encoder.

In FIG. 4, the encoder shaft holder 6 has substantially the same outside diameter as the slip ring unit 2. However, the encoder shaft holder 6 may have any design, such as the one shown in FIG. 5, where the holder has an outside diameter less than that of the slip ring unit 2.

As shown, the encoder shaft holder 6 has a plane surface which can be mounted onto the slip ring unit 2, e.g. by means of glue or screws. However, in another embodiment, the encoder shaft holder 6 has another surface which corresponds to the surface of the slip ring unit 2 so that a connection there between is increased by a mechanical connection.

The encoder shaft holder 6 is moulded from an electrically insulating material, such as plastic, ceramics, fibreglass, or a combination thereof. The material may be strengthened by fibres. The fibres may be present in the plastic blend or compound before moulding the holder. By making the holder 6 in an electrically insulating material, the encoder 4 can no longer be destroyed by unintentional electricity since the holder insulates the encoder from any unintentional transfer of electricity.

Thus, the encoder shaft 5 can be made from any kind of suitable material, such as metal, so that the encoder shaft may be cut into its final dimensions after being fastened in the holder. In this way, the outer dimensions of the encoder shaft 5 can be kept, and the encoder 4 no longer counts inaccurately as a result of inaccurate dimensions of the encoder shaft.

When moulding the encoder shaft holder 6, the holder 6 can be made in any kind of material and the shaft 5 can be fastened by moulding the holder around the shaft. Furthermore, the encoder shaft holder 6 can be moulded together with other parts, such as the slip ring unit and a ground connection 11.

Figure 6:
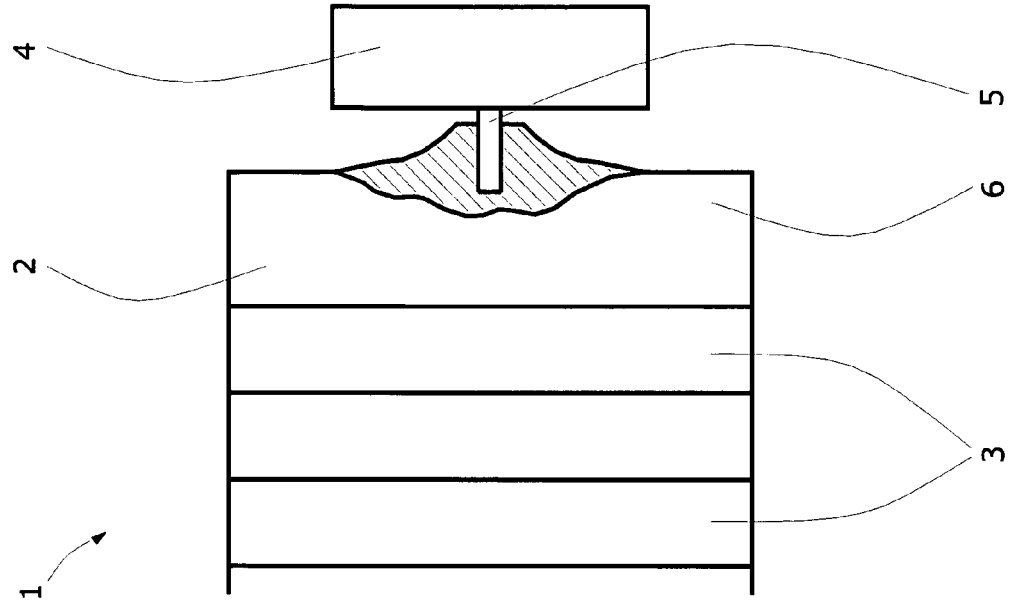
FIG. 6 shows a partly cross-sectional view of a further another embodiment of the slip ring assembly.

As can be seen in FIGS. 4-6, the encoder shaft 5 is fastened within the encoder shaft holder 6 and penetrates only partly through the holder. In another embodiment, the shaft 5 penetrates all the way through the encoder shaft holder 6.

In addition to its insulating properties, it is important that the encoder shaft holder 6 is able to uphold the encoder shaft 5, and furthermore is able to withstand the high temperature generated within the slip ring unit 2 during the transfer of electricity.

Thus, the encoder shaft holder 6 can be made from plastics such as hardened plastic, e.g. polyethylene, melamine, carbamide, epoxy, and polyurethane. When the encoder shaft holder 6 is made from hardened plastic, the holder is able to withstand the high temperature within the slip ring assembly 1 while having enough strength to uphold the encoder shaft 5 and insulating the encoder 4 sufficiently.

The invention has been explained from a holder 6 for holding an encoder shaft 5; however, the shaft could be any kind of shaft that needs to be kept within a narrow dimension tolerance.

The conductive ring or band 3 of the rotating unit of the slip ring unit 2 can be made from every kind of conductive material which also has high thermal conductivity and hardness, such as brass and copper.

The slip ring assembly 1 may be used in any kind of generator comprising both a rotating stator and a rotating rotor, such as a double-fed induction generator, a cascade-regulated generator, an alternator, or a synchronic generator.

The slip ring assembly 1 may also be used in an electrical motor.

A generator comprising such a slip ring assembly 1 may be used in any type of wind turbine, and therefore also in a plurality of wind turbines constituting a wind turbine park.

By a wind turbine is meant any kind of apparatus able to convert wind power into electricity, such as a wind generator, wind power unit (WPU), or wind energy converter (WEC).

Although the invention has been described above in connection with preferred embodiments of the invention, it will be evident for a person skilled in the art that several modifications are conceivable without departing from the invention as defined by the following claims.

The invention claimed is:

1. A slip ring assembly for providing electricity to or from a rotor rotating in relation to a stator in a generator or an electrical motor, the slip ring assembly being connected with an encoder and comprising:
    a slip ring unit having at least one first slip ring, and
    an encoder shaft holder connected with the slip ring unit and in which holder a encoder shaft is situated, wherein the encoder shaft holder is made from an electrically insulating material, and wherein the encoder shaft holder has a projecting part in which the encoder shaft is fastened.

2. The slip ring assembly as claimed in claim 1, wherein the encoder shaft holder is moulded.

3. The slip ring assembly as claimed in claim 2, wherein the electrically insulating material is some kind of plastic, ceramic, fibreglass, or a combination thereof.

4. The slip ring assembly as claimed in claim 1, wherein the encoder shaft holder is glued onto the slip ring unit.

5. The slip ring assembly as claimed in claim 1, wherein the encoder shaft holder has a part having approximately the same circumference as the slip ring unit.

6. The slip ring assembly as claimed in claim 1, wherein the encoder shaft holder and the slip ring unit are moulded together as one.

7. A generator comprising a slip ring assembly as claimed in claim 1.

8. A wind turbine comprising a slip ring assembly as claimed in claim 1.

* * * * *